United States Patent [19]

Gliatas

[11] 4,200,258
[45] Apr. 29, 1980

[54] BUTTERFLY VALVE

[75] Inventor: Themistocles H. Gliatas, Worthington, Ohio

[73] Assignee: Ranco Incorporated, Columbus, Ohio

[21] Appl. No.: 51,842

[22] Filed: Jun. 25, 1979

Related U.S. Application Data

[62] Division of Ser. No. 840,163, Oct. 7, 1977.

[51] Int. Cl.$^2$ ............................................. F16K 1/226
[52] U.S. Cl. ................................... 251/214; 251/305; 251/308; 251/367
[58] Field of Search ............... 251/146, 214, 305, 306, 251/307, 308, 309, 315, 58, 367

[56] References Cited

U.S. PATENT DOCUMENTS

| | | | |
|---|---|---|---|
| 2,729,238 | 1/1956 | Hite | 251/305 |
| 2,783,771 | 3/1957 | Thomas | 251/146 |
| 3,737,144 | 6/1973 | Duncan | 251/307 |
| 3,967,810 | 7/1976 | Pulvermacher | 251/146 |
| 4,060,220 | 11/1977 | Fischer | 251/306 |
| 4,093,178 | 6/1978 | Hughes | 251/305 |
| 4,111,395 | 9/1978 | Sheppard | 251/308 |
| 4,123,035 | 10/1978 | Boudreau | 251/146 |
| 4,133,512 | 1/1979 | Johnson | 251/214 |

FOREIGN PATENT DOCUMENTS 566719  9/1957  Italy ......................... 251/146

Primary Examiner—William R. Cline
Assistant Examiner—H. Jay Spiegel
Attorney, Agent, or Firm—Watts, Hoffmann, Fisher & Heinke

[57] ABSTRACT

A fluid flow controlling butterfly valve assembly is disclosed which comprises a valve body defining a through passage for fluid, a butterfly valving member supported within the body, a shaft extending transversely through the passage and drivingly connected to the valving member, and a shaft supporting structure rotatably supporting the shaft in the body while sealing against leakage from the valve.

In a preferred embodiment the shaft supporting structure includes a band extending about the body and defining recesses aligned with shaft portions emerging from the body. Resilient flexible elements are disposed within the recesses and compressively engage the shaft and body to provide both bearings and seals.

9 Claims, 4 Drawing Figures

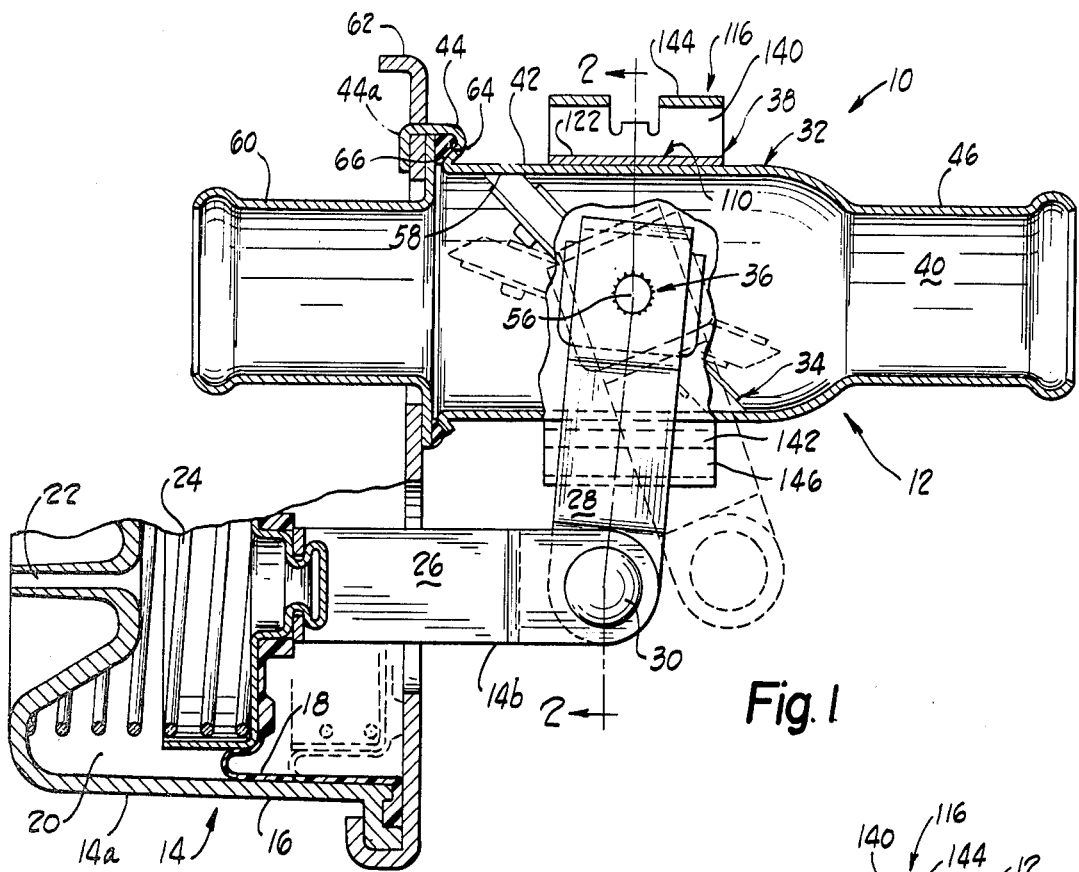
Fig. 1
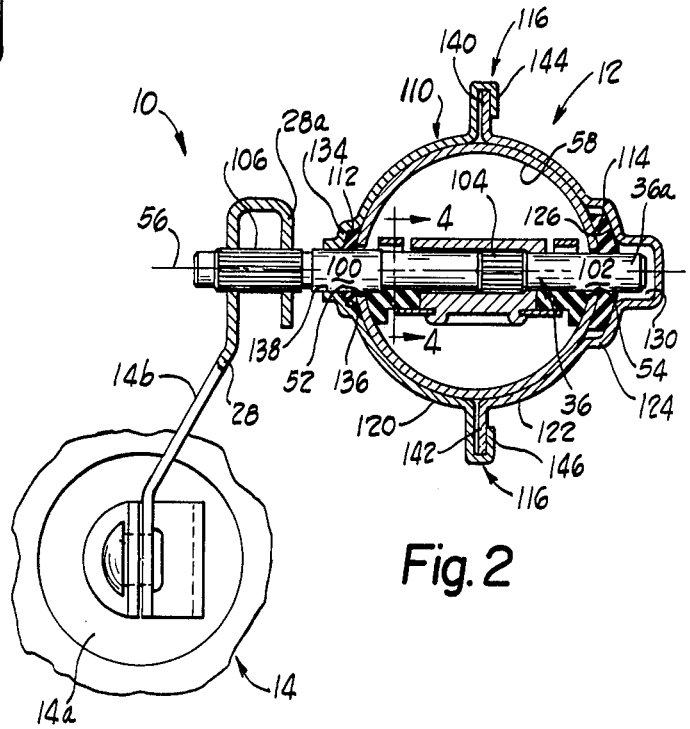
Fig. 2
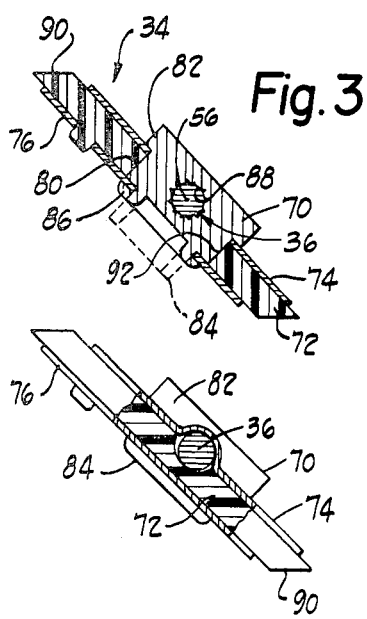
Fig. 3
Fig. 4

BUTTERFLY VALVE

This is a division of application Ser. No. 840,163 filed Oct. 7, 1977.

BACKGROUND OF THE INVENTION

The present invention relates to valves and more particularly to so-called butterfly valves for controlling fluid flow through a conduit.

Butterfly valves have long been used to control fluid flowing in conduits and problems relating to the general design and constructional features of such valves have been recognized. Generally butterfly valves are formed by a plate-like valving member disposed in a fluid flow passage and supported by a shaft or hinge structure for rotation about an axis transverse to the passage to alter the flow rate. The valving member itself is usually configured so that when moved to a closed position the flow passage is completely blocked by the valving member with a fluid tight seal being formed along the juncture of the valving member periphery and the passage. When moved to its opened position the valving member extends generally parallel to the direction of fluid flow and the fluid can flow around it through the passage. The supporting shaft or hinge usually extends through the passage wall to an actuator operable to control the valving member position.

Butterfly valves employed in closed fluid systems tend to develop leaks along the valve supporting shaft. The shaft is normally subjected to bending forces and therefore must generally be provided with some sort of bearing structure in addition to a shaft seal. Various bearing and seal constructions have been proposed by the prior art to minimize the leakage problem. The proposed constructions have, for the most part, required the usage of multi-part bearing and seal components which increase the cost, complexity and degree of difficulty of assembly of the valves.

The construction of the valving members has also presented problems in many butterfly valve applications. Where the valve is used in a liquid system, the periphery of the valving member must effectively seal against the surrounding flow passage yet be readily opened without tending to stick closed. The valving members are generally urged toward the closed positions by fluid pressure differential forces acting on them and as a result of valve actuator overtravel and these forces tend to jam the valving member into its closed position. Various valving member constructions have been proposed to alleviate this problem. Rubber-like flexible, resilient valving members have been frequently employed to assure positive closure of the valves but many of these constructions have tended to stick closed because of the excessive flexibility of the valving member material which tends to promote not only jamming but wear and abrasion of the valving sealing face. Composite valving members formed of rubber or plastic parts supported by structurally strong components have been proposed. Some of these have employed molded-in steel plates while others have clamped rubber-like valving elements to structurally stronger parts.

Butterfly valves have been proposed for use in automotive fluid systems for controlling the flow of engine coolant to heat exchangers which are used to heat air flowing into the passenger compartment of vehicles. Such valves must be extremely reliable in operation while at the same time being of simple enough design to enable low cost, high volume production with a minimum number of complicated assembly steps. Low cost high volume production tends to dictate the use of a one piece cast valve body defining a tubular flow passage for the liquid.

Prior art butterfly valve constructions utilizing a one piece valve body have encountered assembly problems because the butterfly valving member and its driving shaft must be assembled with the valving member already positioned inside the valve body. To do this the valve body has been provided with shaft supporting openings on opposite sides and the valving member has been positioned within the tubular valve body. The shaft was inserted through the valve body so and a joining operation between the valving member and the shaft was performed with the components of the assembly held together by suitable fixturing. In some proposals the shaft was spot welded to the valving member. In others a one-piece plastic valving member was held in place within the valve body and a serrated shaft was driven through the valving member to create the driving interconnection.

These approaches have in general been either difficult to perform quickly and efficiently or have not produced a sufficiently strong and durable valve, or both.

Still another problem with the one piece cast valve bodies was encountered because the valve body wall itself was used to journal the shafts. This required the use of relatively heavy valve body wall sections and the selection of alloys which functioned well as bearings. These factors added to valve body costs.

SUMMARY OF THE INVENTION

The present invention provides a new and improved butterfly valve assembly which is quickly and easily assembled and is of relatively simple design.

One important feature of the new valve construction resides in an actuating shaft supporting structure which provides a combined shaft bearing and seal arrangement for reliably preventing the escape of fluid from the valve assembly. In a preferred valve assembly embodying this feature a valving member is supported in a valve body for rotation by an actuating shaft which extends through openings in the valve body. A shaft supporting structure supports the shaft for rotation while sealing against the loss of fluid from the assembly. The supporting structure includes a band structure extending about the valve body and defining recesses aligned with the valve body openings.

Resilient flexible elements within each recess surround the shaft. The band structure is secured about the valve body so that the resilient elements are compressively engaged with the valve body, band structure and the shaft to provide a bearing support for the shaft while sealing against leakage.

Another important feature of the invention resides in the construction of a butterfly valve assembly having a composite valving member enabling effective and reliable valving member operation while minimizing sticking or jamming in the closed position and which enables simplified assembly of the valve. The preferred valving member includes a supporting hub, a disk-like valving element supported by the hub and sandwiched between plates which are clamped against the valving member by the hub. The plates are resiliently deflectable and tend to deflect when the valving member is subjected to forces which would otherwise jam the valve closed.

The hub is constructed from a structurally strong flowable metallic material and is deformed to clamp the plates against the valving element when the valving member is being assembled. The valving element is controllably and lightly compressed between the plates so that a fluid-tight seal between the hub and valving element is established.

Another important feature of the valving member construction resides in the interconnection between the shaft and the hub. The hub defines a shaft-receiving opening through which the shaft is pressed during assembly of the valve. The shaft and hub opening are provided with a spline-like driving interconnection which is formed by a series of spline-like teeth on the shaft which are driven into the hub material to yield and flow the hub material into conformity with the spline teeth. The valving element support plates resiliently deflect in response to relatively high force levels transmitted to the valving member, and tend to resiliently cushion shock loadings which might otherwise be applied to the interconnection between the hub and the shaft.

Other features and advantages of the present invention will become apparent from the following detailed description of a preferred embodiment made in reference to the accompanying drawings which form a part of the specification.

BRIEF DESCRIPTION OF THE DRAWINGS

FIG. 1 is a fragmentary cross-sectional view showing a butterfly valve assembly and actuator therefor constructed in accordance with a preferred embodiment of the invention;

FIG. 2 is a cross-sectional view seen approximately from a plane indicated by the line 2—2 of FIG. 1;

FIG. 3 is a cross-sectional view of a valving member forming part of the assembly of FIGS. 1 and 2; and FIG. 4 is a cross-sectional view seen approximately from the plane of the line 4—4 of FIG. 2.

DESCRIPTION OF A PREFERRED EMBODIMENT

A flow controller 10 embodying the present invention is illustrated in part by FIGS. 1 and 2 of the drawings. The flow controller 10 includes a butterfly valve assembly 12 and a valve actuator 14. The illustrated flow controller 10 is of the type used to control the flow of liquid engine coolant in parts of an automotive vehicle coolant system for the purpose of governing heating of air circulating in the vehicle passenger compartment. The valve assembly 12 is operated between opened and closed positions by the actuator 14 to start and stop coolant flow to a "heater core". The heater core is formed by a suitable coolant-to-air heat exchanger, may be of any suitable construction and therefore is not illustrated or described.

The actuator 14 may be of any conventional or suitable construction but is illustrated as a vacuum motor 14a and associated articulating linkage 14b by which motion is transmitted to the valve assembly 12. The motor 14a is formed by a rigid cup-like assembly 16 supporting a flexible diaphragm assembly 18 across its open end to define an expansible chamber 20 within the motor (See FIG. 1). The cup-like body 16 further defines a port 22 for communicating the chamber 20 with a source of vacuum pressure such as may exist in the vehicle engine intake manifold or a vacuum pressure reservoir onboard the vehicle.

The pressure within the chamber 20 is governed by a control valve, not shown, which may be constructed to alternately conmmunicate the chamber to the vacuum source or to atmospheric pressure. When the chamber 20 is communicated to vacuum pressure the diaphragm assembly 18 is shifted to reduce the volume of the chamber 20 (toward the left as viewed in FIG. 1). Venting the chamber 20 to atmospheric pressure eliminates the pressure differential across the diaphragm assembly and the diaphragm assembly is moved toward the right, as viewed in FIG. 1, by the action of a compression spring 24 reacting between the diaphragm assembly and the body.

The linkage 14b is preferably formed by a stamped sheet metal operating rod 26 connected to the diaphragm assembly 18, a stamped sheet metal crank 28 connected to the valve assembly 12 and a bearing pin 30 which pivotally interconnects the rod 26 and crank 28. The rod 26 is secured to the diaphragm by a connection which allows limited universal, or swiveling, motion of the rod relative to the diaphragm assembly to accommodate the slightly nonlinear travel path of the pin 30 (See FIG. 1).

The butterfly valve assembly 12 is formed by a valve body 32 which defines a through passage for the coolant flow, a butterfly valving member 34 disposed within the valve body, a shaft structure 36 which is drivingly connected to the valve member 34 for shifting the valve member between open and closed positions and a shaft supporting structure 38 which rotatably supports the shaft structure 36 with respect to the valve body 32 while preventing the escape of fluid from the valve assembly.

The valve body 32 is preferably a tubular member which defines a through flow passage 40 in which the valving member is supported. As is best seen in FIG. 1, the valve body is preferably formed from a die cast aluminum alloy and defines a valve seat portion 32 having a mounting flange formation 44 at one end and a reduced diameter hose nipple 46 at its opposite end. The flange 44 and nipple 46 are continuous with the valve seat portion 42.

The valve seat portion is preferably a one-piece thin walled cylindrical structure defining holes 52, 54 through which the shaft structure 36 extends (See FIG. 2). The interior of the valve seating portion 42 is formed by a smooth cylindrical valve member seating surface 58.

In the illustrated valve the mounting flange formation 44 extends radially outwardly from the valve seating portion 42 and has projecting fingers, only one of which is illustrated at 44a, which are deformed to grip a separate hose nipple member 60 and a structural support element 62 (which is shown only in part). The mounting flange section defines a circumferentially extending seal seat 64 supporting a continuous seal ring 66 compressively engaged between the hose nipple member 60 and the valve body flange. The cross sectional flow area of the hose nipple section 46 and the hose nipple member 60 are about equal and are substantially the same as the effective flow area through the valve seating portion 42 when the valving member 34 is in its fully opened position. This tends to minimize flow restrictions and consequent pressure drops across the valve.

The preferred valving member 34 is a composite assembly of components which coact to provide improved valving member performance. Referring to FIG. 3 the valving member 34 is formed by a hub 70, a valving element 72 which is supported on the hub and first and second plates 74, 76 carried by the hub and disposed on opposite sides of the valving element.

The hub 70 is drivingly connected to the shaft 36 and preferably formed of metal, such as a die cast aluminum alloy, which is flowable when worked yet structurally strong and corrosion resistant. The hub has a central cylindrical barrel portion 80, a keeper flange 82 at one end of the barrel and a thin walled reduced diameter skirt 84 (broken lines, FIG. 3) which projects in the direction of the extent of the barrel 80 from a radial shoulder 86 at the end of the barrel. A shaft-receiving opening 88 extends through the hub 70 and is illustrated as a straight cylindrical hole aligned with the transverse axis 56 for reception of the valve-supporting shaft 36.

The valving element 72 is preferably a molded disc of flexible resilient rubber-like material which has generally elliptical major surfaces. The valving element defines a continuous, cylindrical peripheral sealing face 90 configured to engage the valve body seating surface 58 over a relatively broad area completely about the periphery of the valving element when the valve is closed. The valving element defines an opening 92 through which the barrel 80 extends. The opening 92 provides for sealing engagement with the barrel 80 so that leakage through the valving member is avoided.

In the preferred embodiment the valving element is lightly compressed between the plates 74, 76 to enhance the seal between the inner periphery 92 and the barrel 80. The plates 74, 76 are preferably formed from thin structurally strong sheets of spring metal, are elliptical in shape and define central openings for receiving the hub 76. The plate 74 surrounds the barrel 80 and is engaged with the end flange 82 while the plate 76 surrounds the skirt 84 which, when the valving member is assembled, is upset to clamp the plate 76 firmly against the shoulder 86. In this regard the hub 70 is similar to a rivet in permitting quick and easy assembly.

The combined thicknesses of the plate 74 and the valving element 72 are slightly greater than the length of the barrel 80. When the skirt 84 is upset in the manner described compression of the valving element occurs in a controlled manner to assure that the valving element seals about the barrel.

Each plate 74, 76 is shaped substantially like the respective major face of the valving element against which it is placed but is of smaller diametrical extent than the valving member to permit a flexible valving element "lip" to extend about the valving member periphery. In the illustrated embodiment (FIGS. 3 and 4) the plate 76 is provided with an opening through which a molded-in alignment lug of the valving element extends to assure that the plate 76 and valving element are appropriately aligned for assembly. The valving element and plate 74 are each formed with shaft accommodating recessed portions (FIG. 4) which are aligned with the hub opening 88 to assure that these elements are properly positioned for assembly.

The plates 74, 76 function as leaf springs and can deflect if the valving member is urged to or from its closed position by an excessively great force and when shock loadings occur. Flexure of the plates when the valving member is urged closed tends to prevent the valving element material from being cut by the plates and/or unduly compressed against the valve body. Flexure of the plates as a result of valve opening forces better enables the valve member to be opened without jamming and abraison or cutting. If sudden opening or closing forces are applied to the valving member deflection of the plates cushions shock loadings which might otherwise be applied to the driving connection between the hub 70 and the shaft 36.

The shaft structure 36 is supported on opposite sides of the valve body 32 and is drivingly connected to the valving member 34 to rotate the valving member between its open and closed positions. The valve body, valving member and shaft structure are assembled by inserting the valving member in the valve body and then inserting an end 36a of the shaft structure through the valve body opening 52, the hub opening 88 and the valve body opening 54. The shaft structure defines spaced bearing sections 100, 102 at which it is supported with respect to the valve body, a connector section 104 between the bearing sections by which the shaft is connected to the valving member and an actuator connector section 106 at the shaft end nearest the actuator 14.

The bearing section 102 is defined by a smooth cylindrical surface of the shaft which projects loosely through the valve body opening 54. The diameter of the bearing section 102 is less than that of the valve body holes 52, 54 and of the hole 88 through the hub 70 so that the bearing section 102 is not abraded during assembly.

The connector section 104 has a non-circular cross sectional shape and is constructed and arranged so that when the shaft is moved through the hub opening 88 the hub material is deformed and flows to at least partially conform to the shaft connector section shape to produce a driving connection. In the preferred embodiment the connector section 104 is defined by a series of circumferentially spaced apart spline-like teeth and has a maximum diametrical extent which is greater than that of the shaft bearing section 102 and of the hub opening 88. The teeth, which may be formed on the shaft by a knurling tool, move into the hub opening 88 during assembly and effectively form a conforming splined hub opening interior by deforming and flowing the hub material into conformity with the connector section. The axial extent of the connector section is limited to minimize the force required for pressing the shaft through the hub while assuring that the hub-to-shaft connection transmits adequate torque to operate the valve under all reasonably expected conditions of operation.

The bearing section 100 is formed by an enlarged smooth cylindrical portion of the shaft loosely received by the valve body opening 52. The bearing section 100 does not extend into the hub opening 88 and preferably has a diametrical extent which is at least as great as the maximum extent of the connector section 104.

The actuator connector section 106 is illustrated as a splined, or knurled, shaft section which has the same diametrical extent as the connector section 104 and which is pressed into engagement with the crank 28. The crank 28 is provided with a return bent end portion 28a having aligned shaft-receiving holes to prevent the crank from twisting relative to the shaft as well as to increase the torque transmitting capability of the crank-to-shaft connection. The aligned crank holes and the shaft section 106 have an interference fit so that the driving connection between the crank and the shaft is formed, like the connection between the valving member and the shaft, by pressing the connector section 106 through the crank openings.

The shaft supporting structure 38 supports the shaft structure 36 and the valving member 34 for rotation relative to the valve body without imposing bearing stresses on the valve body material and seals against the leakage of liquid from the valve body along the shaft. The shaft supporting structure 38 includes band structure 110 extending about the exterior of the valve body, bearing and sealing elements 112, 114 carried by the band structure, and a connecting structure, generally indicated by the reference character 116, for maintaining the band structure and elements assembled to the valve body and shaft structure.

The band structure 110 is preferably formed by a pair of sheet metal straps 120, 122 each of which is bent in a generally semi-circular shape to approximate the outside diameter of the valve body. Each strap extends closely about the exterior of the valve body. The strap 122 is formed with a stamped cup-like recess 124 aligned with the valve body opening 54. The recess includes a circularly shaped recess wall 126 which is spaced radially away from the valve body and surrounds the projecting shaft end 36a. A closed recess end portion is disposed about the end of the shaft so that the recess 124 defines a chamber 130 into which the shaft end 36a projects.

The strap 120 is substantially like the strap 122 and defines a recess 134 which is aligned with the valve body opening 52. The recess 134 is formed with a circular recess wall 136 which is spaced radially away from the outside of the valve body and an opening 138 through which the shaft structure extends.

The bearing-sealing elements 112, 114 are preferably annular flexible, resilient rubber-like elements. Each element extends continuously about the respective shaft bearing section 100, 102 and is disposed within its respective recess 134, 124. In their unstressed, or relaxed, conditions the elements have inner diameters which are sized so that they are not appreciably stretched when the shaft extends through them.

The axial thickness of each of the elements 112, 114, when relaxed, is greater than the distance between the valve body and the respective associated recess wall so that when the clamp structure 116 secures the straps 120, 122 in place, each bearing-sealing element is axially compressed between the valve body and its associated recess wall portion. This compression causes the inner diameter of each bearing-sealing element to firmly yet resiliently engage its associated shaft bearing section resulting in any shaft bearing loads being borne by the bearing-sealing elements without requiring the valve body wall to support the bearing loads. At the same time, the bearing-sealing elements are urged into compressive sealing engagment with the shaft and the valve body immediately surrounding the shaft with secondary seals being formed by the compressive engagement between the sealing-bearing elements and their associated recess walls.

The shaft supporting structure thus permits the valve body walls to be relatively thin since the walls need not function as bearings for the shaft. Likewise the valve body alloy need not have properties which might otherwise be required if the valve body were to function as a bearing. The holes 52, 54 are sized to closely surround their associated shaft bearing sections to minimize the possibility of extrusion of the bearing-sealing elements through the valve body openings. The shaft supporting structure 38 is sufficiently rigid that the shaft remains spaced from the valve body openings under loads normally encountered.

The bearing-sealing element 112 is preferably formed by an O-ring, i.e., a ring having a circular cross sectional shape, and the inner diameter of the O-ring is preferably the same, at the very smallest, as the shaft connector section 104. When the shaft structure 36 passes through the O-ring 112 during assembly the inner diameter of the O-ring is thus not scored or otherwise abraded by the spline teeth on the section 104.

The connecting structure 116 is formed by adjacent ends of the straps 120, 122 which are deformed to clamp the straps together with the recess walls being drawn radially towards the valve body to accomplish the compression of the bearing-sealing elements referred to. In the preferred and illustrated embodiment both ends of the strap 122 are formed with a pair of axially spaced radially projecting fingers 140, 142. Both ends of the strap 120 are likewise formed with axially spaced pairs of radially projecting fingers 144, 146 which are of greater length than the fingers 140, 142. When the valve assembly has been substantially completed the fingers 144, 146 are moved adjacent the corresponding fingers on the strap 122 and bent over so that the strap fingers are clinched together as illustrated by FIG. 2. This operation clamps the straps together about the valve body and, because the clamping operation takes place at roughly 90° from each of the bearing-sealing elements the compressive force exerted by each recess wall on the associated bearing-sealing element tends to be uniformly distributed.

While a single embodiment of the invention has been illustrated and described in considerable detail, the present invention is not to be considered to the precise construction shown. Various adaptations, modifications and uses of the invention may occur to those skilled in the art to which the invention relates and the intention is to cover all such adaptations, modifications and uses which come within the scope or spirit and the appended claims.

What is claimed is:

1. A fluid flow controlling valve assembly comprising:
   (a) a tubular valve body defining a through passage for fluid flow;
   (b) a butterfly valving member supported within said valve body;
   (c) a shaft extending transversely of said passage, said shaft drivingly connected to said valving member for rotating said valving member within said passage, said shaft defining spaced sections extending through openings in said valve body; and,
   (d) shaft supporting means supporting said shaft for rotation within said openings and sealing against the escape of fluid from said valve assembly through said openings, said shaft supporting means comprising:
      (i) band structure disposed about said body and defining first and second recesses aligned respectively with said openings, said recesses each defining a recess wall portion spaced outwardly from the valve body, said shaft portions extending into said respective recesses;
      (ii) a resilient flexible element disposed within each of said recesses, each said resilient flexible element extending about an adjacent respective shaft section; and,
      (iii) connecting means for securing said band structure about said valve body with said band structure compressively engaging each of said resilient flexible elements between said body and a respective recess wall portion, said elements urged into bearing engagement with said shaft sections.

2. The valve assembly claimed in claim 1 wherein one of said recesses defines a chamber surrounding an end of said shaft, one of said flexible elements sealingly engaged between said body and said recess surface to seal said chamber.

3. The valve assembly claimed in claim 1 wherein said shaft extends from one of said recesses to a shaft actuator, said flexible element in said one recess sealingly engaging said shaft and said valve body about the opening through which said shaft extends.

4. The valve assembly claimed in claim 1 wherein said band structure is formed by a deformable sheet metal strap and said connecting means comprises a portion of said sheet metal strap which is yieldably deformed to clamp said band structure in place with respect to said valve body.

5. The valve assembly claimed in claim 4 wherein said connecting means is formed by end portions of said band structure which overlie each other and are clinched together.

6. The valve claimed in claim 5 wherein said band structure is formed by first and second straps each extending partially around said valve body, adjacent ends of said straps clinched together.

7. The valve claimed in claim 1 wherein said valving member comprises a hub connected to said shaft and a resilient flexible element surrounding and supported by said hub, said hub defining an opening through which said shaft extends, one of said shaft or hub defining a series of projecting spline-like teeth which interfit with conforming slots in the other of said shaft or hub.

8. The valve claimed in claim 7 wherein said spline-like teeth are formed on said shaft and form conforming slots in said hub when said shaft is placed in said hub opening.

9. The valve claimed in claim 8 wherein one of said shaft sections is disposed adjacent a projecting end of said shaft and has a diameter which is no greater than the diameter of said spline-like projections, said other shaft section having a diametrical extent no less than the diametrical extent of said spline-like teeth.

* * * * *